(12) United States Patent
Auerbach et al.

(10) Patent No.: US 8,770,643 B2
(45) Date of Patent: Jul. 8, 2014

(54) TAMPER RESISTANT BATTERY COMPARTMENT

(75) Inventors: Mitchell Edward Auerbach, Plainfield, IL (US); Robert B. Riggs, Canton, MI (US); Scott Suumeyer, Tulsa, OK (US); Matthew Joseph Flaherty, Wheaton, IL (US); Steven W Imel, St. John, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 168 days.

(21) Appl. No.: 13/455,261

(22) Filed: Apr. 25, 2012

(65) Prior Publication Data

US 2013/0285410 A1 Oct. 31, 2013

(51) Int. Cl.
*B60R 9/00* (2006.01)
(52) U.S. Cl.
USPC .......................................... 296/37.1; 180/68.5
(58) Field of Classification Search
USPC .......................................... 296/37.1; 180/68.5
See application file for complete search history.

(56) References Cited

U.S. PATENT DOCUMENTS

| 4,074,786 | A | * | 2/1978 | Joubert ........................ 180/68.5 |
| 5,006,078 | A | | 4/1991 | Crandall et al. |
| 5,534,364 | A | | 7/1996 | Watanabe et al. |
| 6,547,020 | B2 | | 4/2003 | Maus et al. |
| 6,817,433 | B1 | * | 11/2004 | Bergstrom et al. ........ 180/89.12 |
| 7,237,636 | B2 | * | 7/2007 | Ruppert et al. ............ 180/89.17 |
| 2005/0134070 | A1 | * | 6/2005 | Plentis et al. ................ 296/37.1 |
| 2009/0068551 | A1 | | 3/2009 | Bernard et al. |

* cited by examiner

*Primary Examiner* — Joseph Pape
(74) *Attorney, Agent, or Firm* — Jeffrey P. Calfa; Mark C. Bach

(57) ABSTRACT

Motor vehicles assembled using a cutaway truck chassis may contain one or more batteries. These batteries may be accessible presenting potential for harm. The tamper resistant compartment for a battery in a passenger vehicle reduces access and visual interest that some may have in the batteries, while simultaneously providing easy access to mechanics. The tamper resistant compartment encompasses a box that is securely mounted to the chassis. The batteries inside the box may be connected to a remote battery stud and a battery shut-off switch. A movable panel integrated to the vehicle body serves as a covering and a door integrated to the movable panel provides access to the remote battery stud and battery shut-off switch.

11 Claims, 7 Drawing Sheets

TAMPER RESISTANT BATTERY COMPARTMENT

BACKGROUND

Motor vehicles that are assembled using a cutaway truck chassis may contain one or more batteries in a location other than the underhood. Even though these batteries are often located under the cab of the truck, these batteries are accessible to the motor vehicle driver, passengers and other unauthorized individuals. The individuals from the general public, including children, who use motor vehicles assembled using a cutaway truck chassis may be careless or unaware of the dangers of handling the batteries and the related accessories. If unauthorized individuals handle the batteries, in doing so, they could hurt themselves from electrical shocks, burns or cuts, or they could damage the equipment.

The present embodiment keeps reduces access and visual interest that the general public may have in the batteries; while simultaneously, providing easy access to mechanics and equivalently skilled technicians when servicing the motor vehicle electrical system from the outside.

SUMMARY

The embodiment presented provides for a tamper resistant compartment for a battery installed in a motor vehicle having a chassis mounted on a body. This tamper resistant compartment houses one or more batteries installed outside the underhood of the motor vehicle. The tamper resistant compartment encompasses a box that is securely mounted to the chassis, usually underneath the seat of the driver. The securing mechanism is capable of holding the box containing batteries in position when subjected to strong g-forces from any direction. This box can have between three to six walls and is of sufficient size to accommodate multiple batteries. There is a bracket adjacent to the box that may retain a remote battery stud and a battery shut-off switch. The batteries do not always require a remote battery stud or a shut-off switch. The remote battery stud may be added to apply a charge to another vehicle or be charged itself from another vehicle or from a device that produces a charge.

After the battery is installed, a cover is placed on the side of the box facing the body of the motor vehicle to protect the battery from road grime, debris and other environmental elements. The cover may be completely removable. The box containing the battery and the cover are concealed by a movable panel that is integrated to the body of the motor vehicle. The movable panel serves as a modesty covering and may be painted in the same color as the rest of the body. The fasteners used to install the movable panel could be of the type in which a tool such as a screwdriver can be used to mount and dismount the movable panel from the body. In the alternative, the fastener may be thumbscrew or a type of screw that is intended to be tightened and loosened by hand. A hinged door is integrated into the movable panel and configured to provide easy access to the remote battery stud and the battery shut-off switch.

The fasteners may be painted the same color as the body of the motor vehicle and recessed. If the tamper resistant compartment for the battery is located under the driver or passenger seat, a movable step may be securely attached in front of the movable panel.

DETAILED DESCRIPTION OF DRAWINGS

Figure 1:
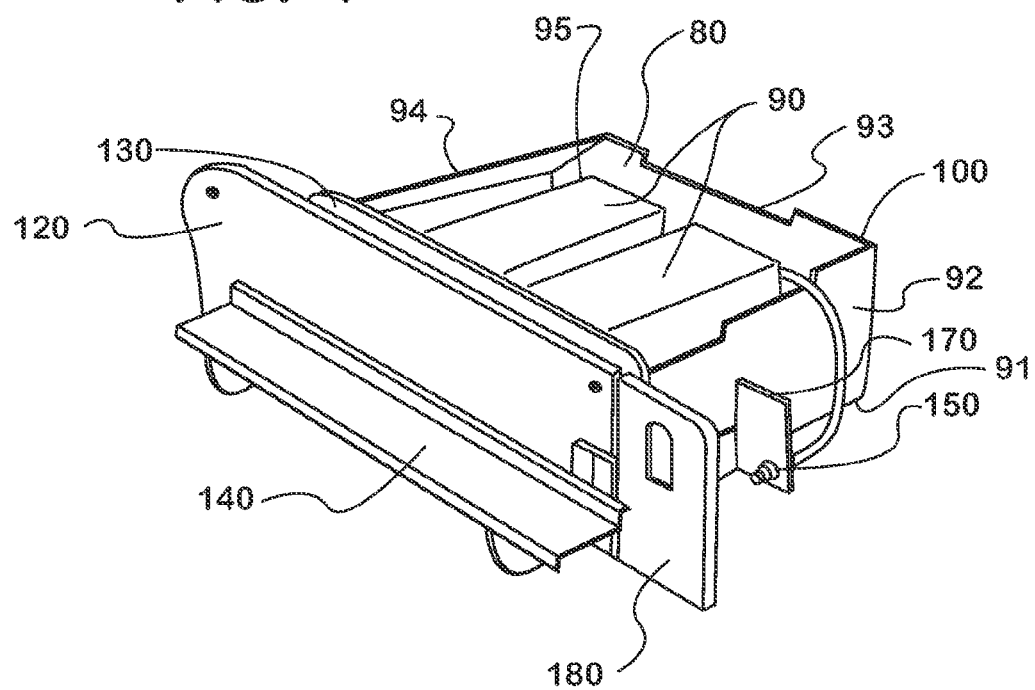
FIG. 1. shows a perspective view of tamper resistant compartment.

FIG. 1 shows an embodiment of the tamper resistant compartment 80 for accommodating one or more batteries 90. The box 100 that houses one or more batteries 90 has a bottom wall 91 where the batteries 90 rest, a first lateral wall 92, a second lateral wall 93, a third lateral wall 94, a top wall 95, and a cover 130. The box 100 may be configured to have less than five walls in order to resemble a tray or a basket or may be configured to be completely enclosed by having six walls.

The two batteries 90 in FIG. 1 are connected to a remote battery stud 150. The remote battery stud 150 provides a mechanism. The remote battery stud 150 may be added to apply a charge to another vehicle or be charged itself from another vehicle or from a device that produces a charge.

The remote battery stud 150 is secured to a bracket 170 attached to the box 100 housing the battery 90. FIG. 1 also shows the top portion of the cover 130 that is mounted between the batteries 90 and a movable panel 120. The cover 130 is intended to protect the batteries 90 from road grime, debris and other environmental elements.

A movable panel 120 serves as a modesty covering and is intended to conceal the box 100 containing the batteries 90 from the general public. A movable step 140 is securely attached in front of the movable panel 120. Both the movable panel 120 and the movable step 140 can be removed by a mechanic in order to gain access to the battery 90. A door 180 is integrated to the movable panel 120 and is hinged on one side from the front end in order to swing open towards a person and facilitate access to the remote battery stud 150 while maintaining the batteries 90 out of reach from the general public.

Figure 2:
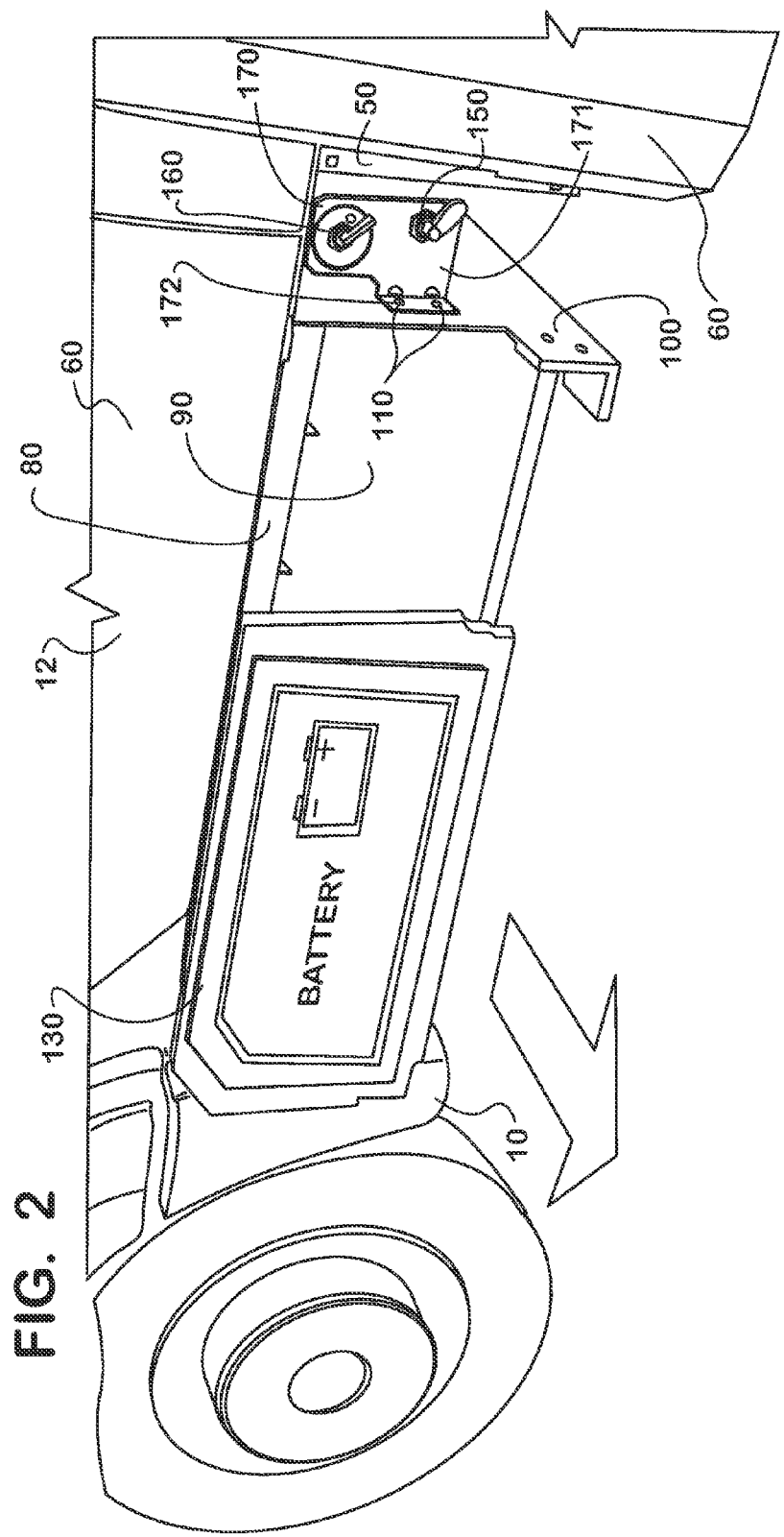
FIG. 2. shows a side view of a segment of the body of a motor vehicle containing the tamper resistant compartment.

FIG. 2 shows the tamper resistant compartment 80 partially dismantled (only with box 100, bracket 170, battery 90, cover 130, remote battery stud 150 and battery shut-off switch 160), and situated under the driver side seat 12. The box 100 in FIG. 2 is affixed to the chassis 50 of a motor vehicle 10; however, the box 100 can also be mounted on tracks or a wheeled mechanism that would allow the box 100 slide out or swing out of the body 60.

The cover 130 that protects the batteries 90 from debris and road grime may be of rectangular shape and of sufficient height and width to completely or partially close off the exposed the segment of the box 100 that is used to access the batteries 90. The cover 130 may be manufactured out of a plastic material, such as thermo plastic olefin, or any other material of sufficient strength, and adequate vibration and thermal resistance suitable for medium to heavy duty motor vehicles. The cover 130 shown is configured so that a mechanic can completely remove it in order to inspect, to service or to replace the battery 90. However, the cover 130 could also be attached to the box 100 with a hinge or fastener that would facilitate the cover 130 to swing-out or slide-out. A cover 130 that swings-out or slides-out could provide a mechanic access to the battery 90 without the need of completely removing such cover 130.

Adjacent to the box 100 in FIG. 2 is the bracket 170 that retains in place the remote battery stud 150 and the battery shut-off switch 160. The bracket 170 may be manufactured out of a metal alloy material such as steel or any other material of sufficient strength, and with adequate vibration and thermal resistance commonly used for medium to heavy duty motor vehicles. The bracket 170 has a first flat surface 171 with perforations to accommodate the remote battery stud 150 and the battery shut-off switch 160 terminals. The bracket 170 has a second surface 172 perpendicular to the first surface 171. The second surface 172 connects the bracket 170 to the first lateral wall 92 of the box 100 with the use of fasteners 110. However, the bracket 170 can be affixed to the box 100 by crimping, welding, soldering, brazing, gluing, or the use of other adhesives.

The remote battery stud 150 in FIG. 2 may be any commercially available battery jump stud with the function of applying a charge to another vehicle or be charged itself from another vehicle or from a device that produces a charge. The cables (not shown) connecting the battery 90 to the remote battery stud 150 shall be of sufficient length to allow the battery 90 to be fully extended during servicing, inspection or replacement.

The battery shut-off switch 160 may be any commercially available accessory with a function of removing the battery power from the motor vehicle 10. The cables (not shown) connecting the battery 90 to the battery shut-off switch 160 shall be of sufficient length to allow the battery 90 to be fully extended during servicing, inspection or replacement.

Figure 3:
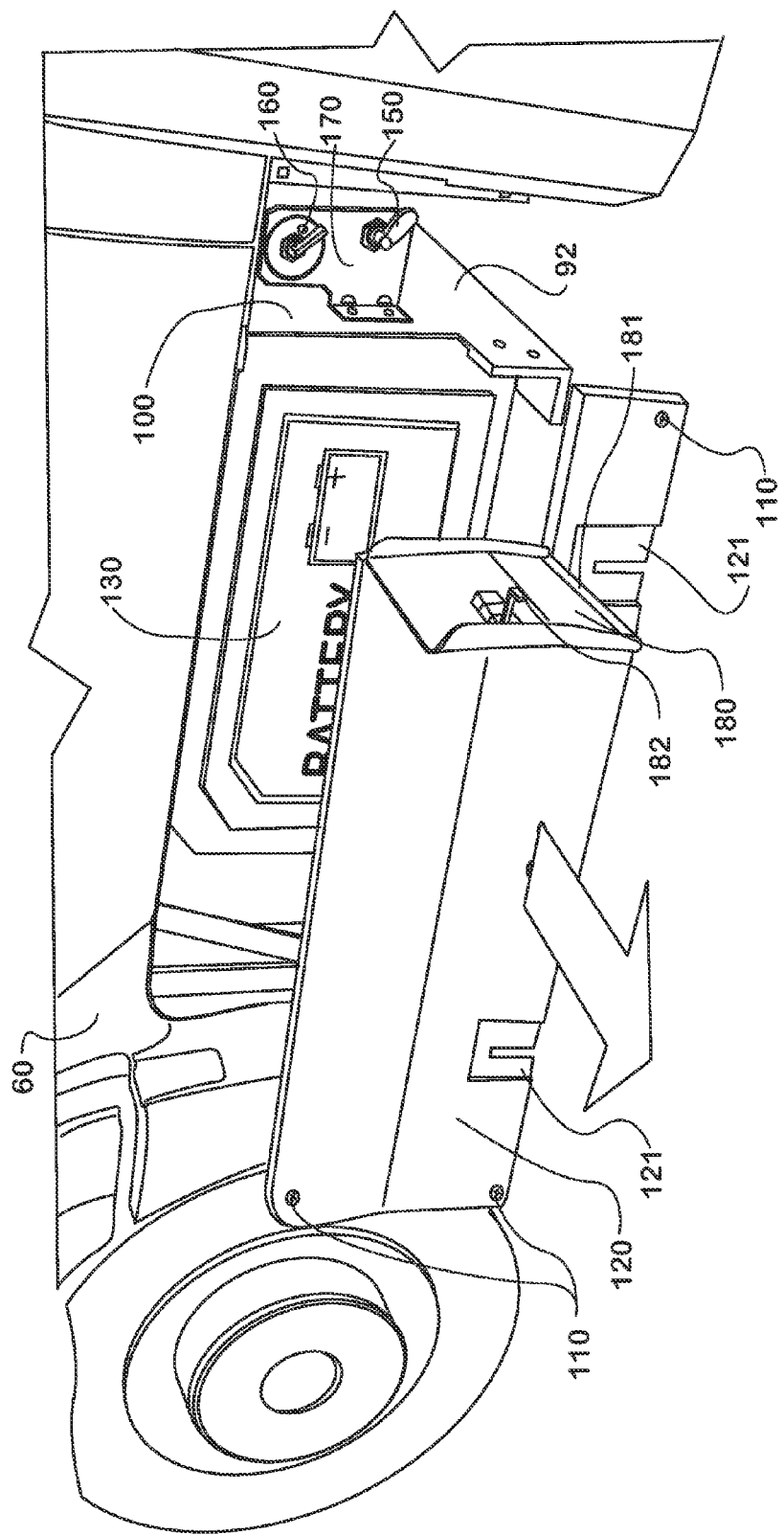
FIG. 3. shows an exploded view of a segment of the body of a motor vehicle containing the tamper resistant compartment.

FIG. 3 shows the movable panel 120 and the door 180 in a detached mode and superimposed over the box 100 with an installed cover 130 and the bracket 170. As a unit, the movable panel 120 and the door 180 is of rectangular shape, without being exact, and of sufficient height and width to fit tightly to the body 60, and does not present sharp edges or snagging points. The movable panel 120 should completely or partially close-off access to the box 100 housing the batteries 90. The bottom end of the movable panel 120 may have one or more notches 121 to accommodate brackets 141 attached to the movable step 140. The notches 121 may have attached a rubber-like material to close out around the movable step 140 attachment.

The movable panel 120 and the door 180 will typically be constructed out of the same material as the rest of the body 60, such as fiberglass. The movable panel 120 is attached to the body 60 via brackets (not shown) attached to the body 60. The movable panel 120 shown in FIG. 3 is configured to be securely attached to the body 60 using a plurality of fasteners 110 that can be removed and then be fastened again with a simple tool such as a screwdriver. In the alternative, the fastener 110 may be a thumbscrew or a type of screw that is intended to be tightened and loosened by hand. The head of fasteners 110 may be painted in the same color of the movable panel 120 in order to better conceal a fully assembled tamper resistance compartment 80.

The door 180 in FIG. 3 is shown in the open configuration and it has a hinge 181 on one side and a latch 182. The hinge 181 allows for the manual outward rotation of the door 180 by an individual and the latch 182 holds the door closed. The door 180 may be constructed out of the same material as the movable panel 120. The door 180 is of sufficient height and width such that in the open configuration it allows an individual to access and operate the remote battery stud 150 and the battery shut-off switch 160 terminals.

Figure 4:
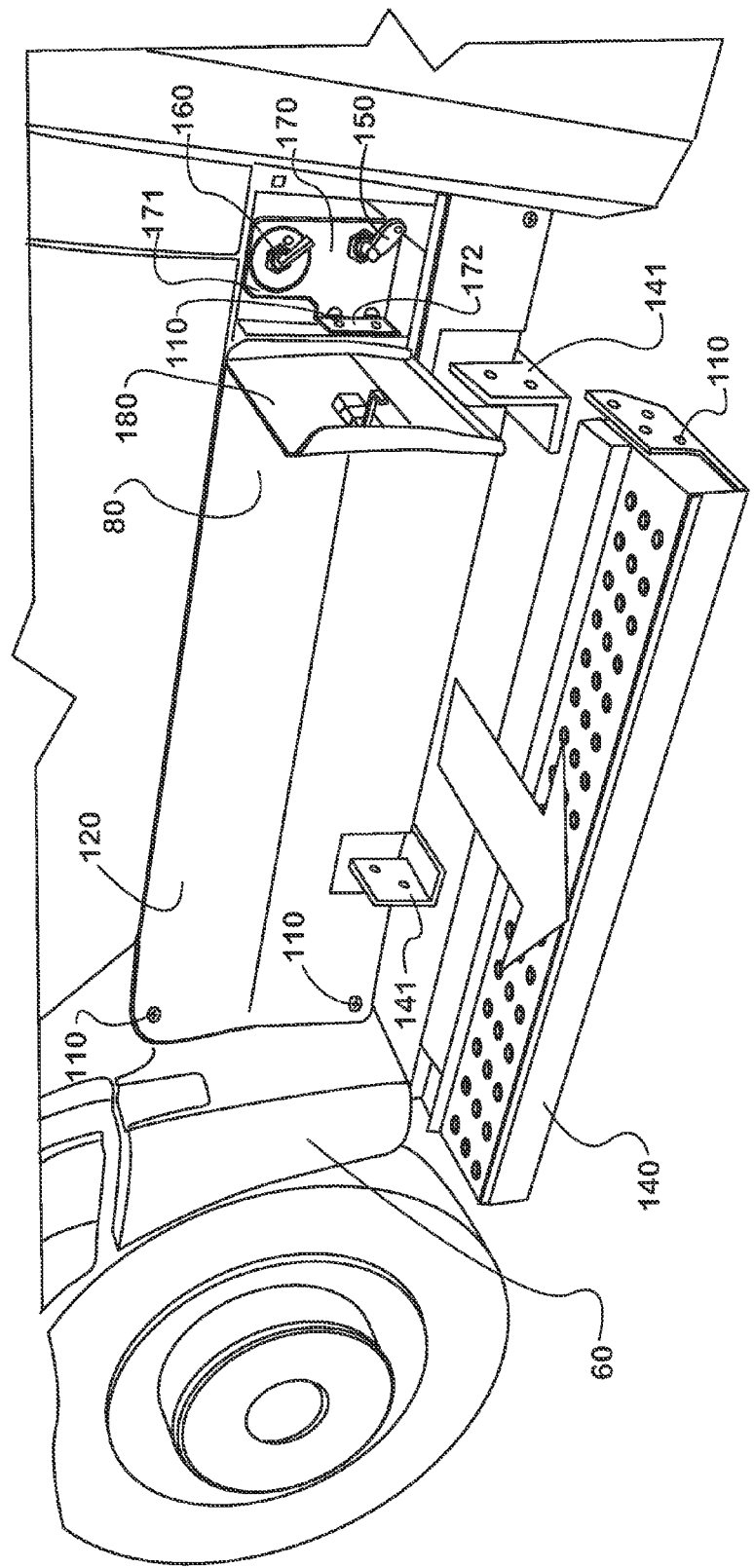
FIG. 4. shows a side view of a segment of the body of a motor vehicle containing the tamper resistant compartment.

FIG. 4 shows the movable step 140 in a detached mode and under the tamper resistant compartment 80 containing the batteries 90. The movable step 140 may be attached to the chassis 50 via a structure that also supports the box 100. The fasteners 110, whether or not tamper-proof, should be easily removable by a mechanic or equivalent skilled individual by using simple tools. The movable step 140 may be constructed of a metal alloy such as steel or aluminum and be of sufficient size to facilitate entry into the body 60 of the motor vehicle 10.

Figure 5:
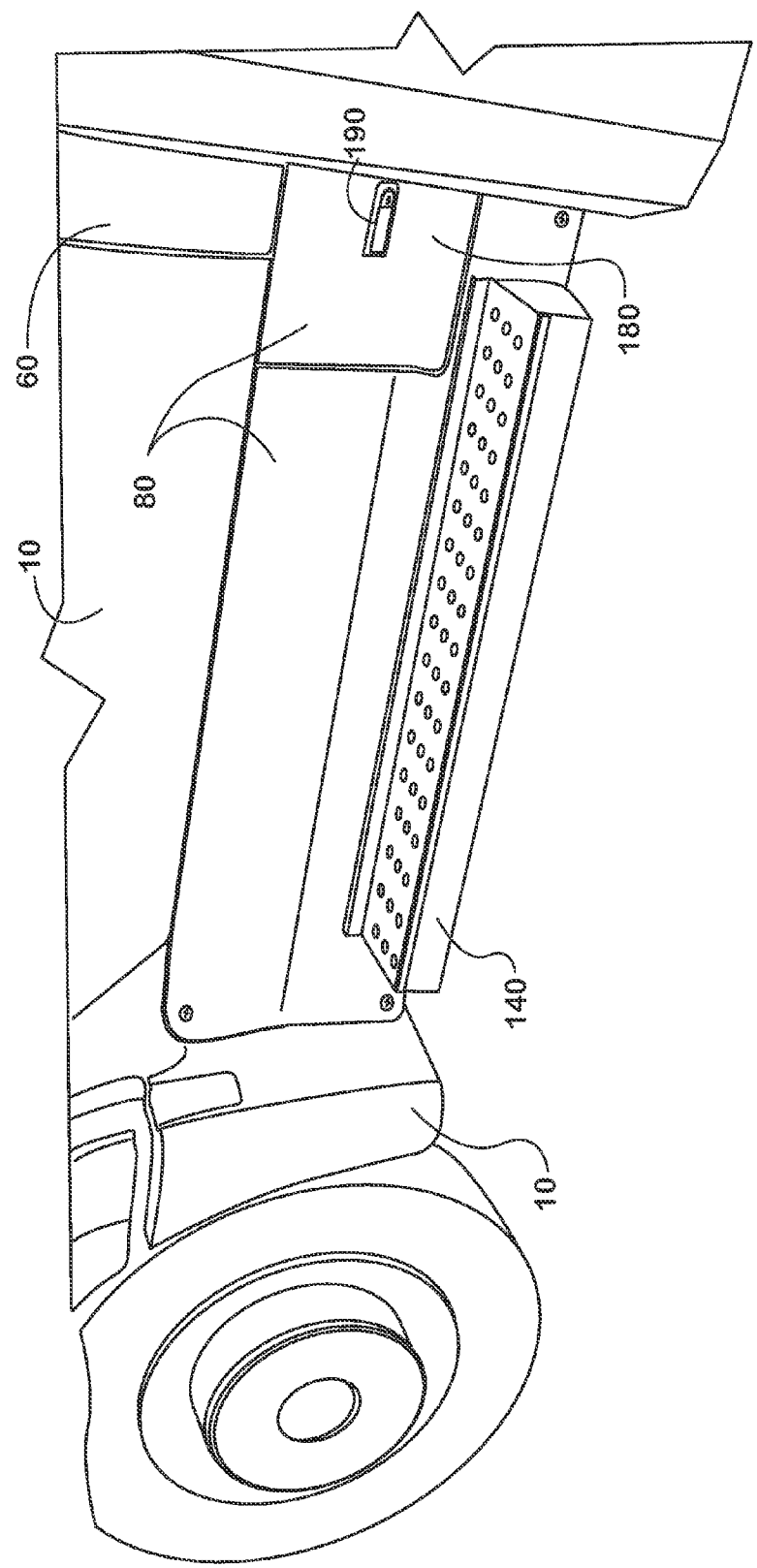
FIG. 5. shows a side view of a segment of the body of a motor vehicle containing the tamper resistant compartment.

FIG. 5 shows an embodiment of the fully assembled tamper resistant compartment 80 from the perspective view of the general public in the proximity of the motor vehicle 10. The door 180 is in the close configuration and has a lockable latch 190. The lockable latch 190 may be installed as part of the door 180 to secure the remote battery stud 150 and the battery shut-off switch 160 (not shown). The lockable latch 190 may of the type commercially available to use in motor vehicles.

Figure 6:
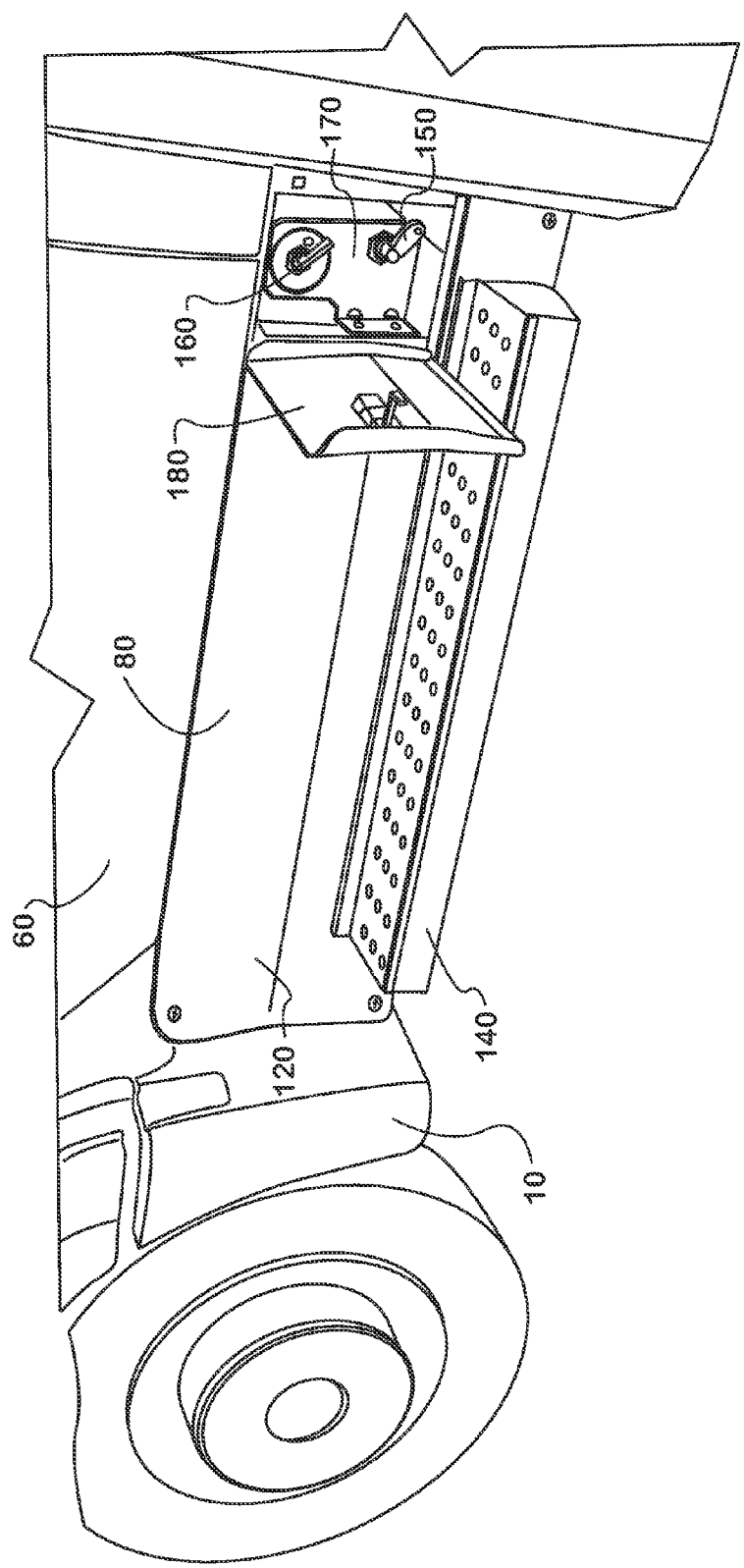
FIG. 6 shows a side view of a segment of the body of a motor vehicle containing the tamper resistant compartment.

FIG. 6 shows an embodiment of the fully assembled tamper resistant compartment 80 from the perspective view of the general public in the proximity of the motor vehicle 10 with the door 180 in the open configuration exposing the remote battery stud 150 and the battery shut-off switch 160.

Figure 7:
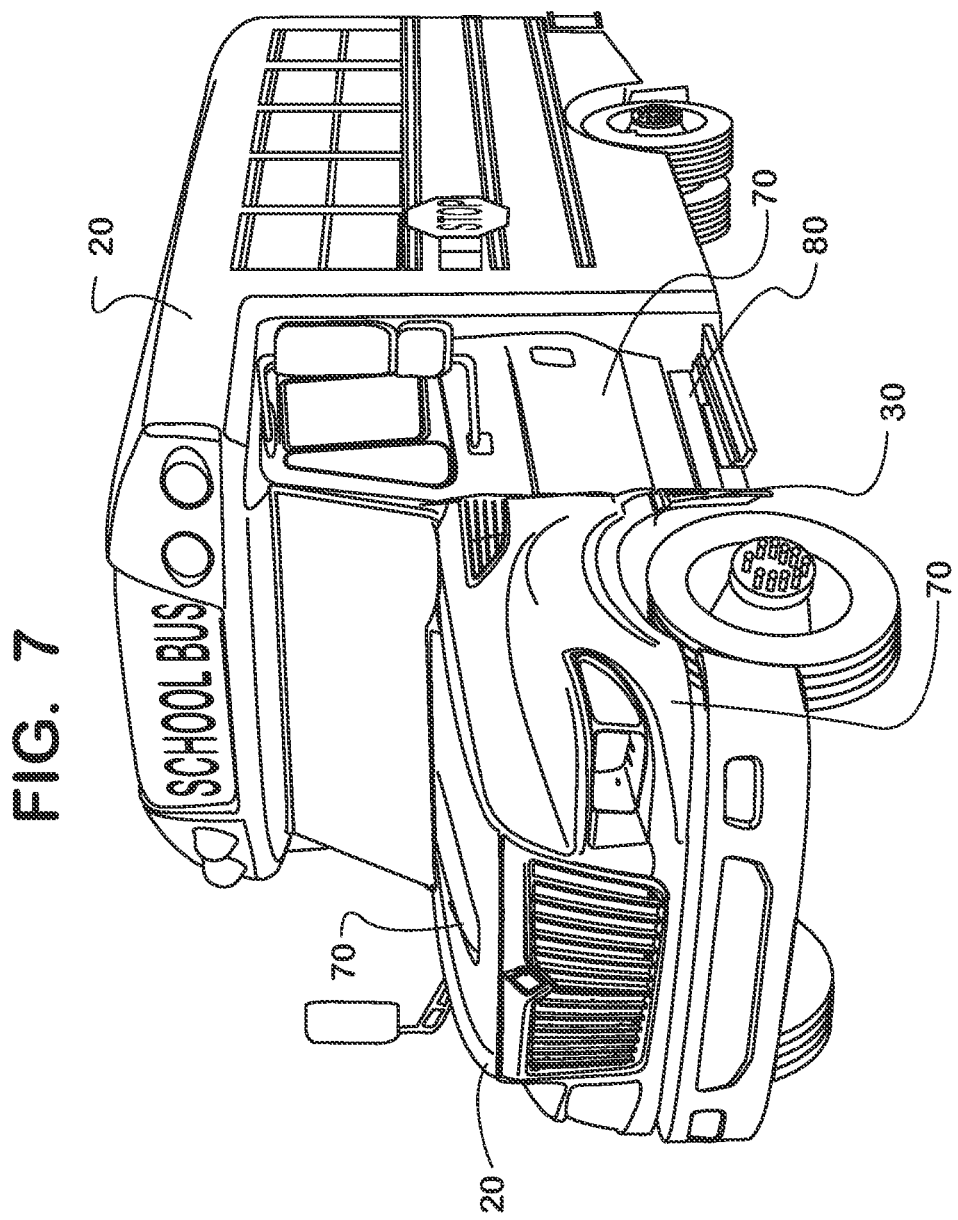
FIG. 7 perspective view of a passenger bus using a cutaway truck chassis.

FIG. 7 shows an embodiment of the tamper resistant compartment 80 used in a passenger bus 20 using a cutaway truck comprising a cutaway truck chassis 30 and a cab body 70. The tamper resistant compartment 80 from FIG. 1 is securely mounted to the cutaway truck chassis 30 and integrated to the cab body 70.

The invention claimed is:

1. A motor vehicle comprising:
a chassis;
a body mounted on the chassis;
a tamper resistant compartment for at least one battery,
wherein the tamper resistant compartment for at least one battery is mounted on the chassis and integrated to the body;
at least one battery inside the tamper resistant compartment; and
a remote battery stud connected to at least one of the batteries, wherein the tamper resistant compartment further comprises:
a box for containing at least one of the batteries, the box is mounted to the chassis;
a movable panel mounted alongside the box;
a plurality of fasteners, the plurality of fasteners affix the movable panel to the body; and
a door, wherein the door is integrated to the body in the closed configuration and in the open configuration the door provides access to the remote battery stud.

2. The motor vehicle of claim 1, wherein the tamper resistant compartment comprises:
a box;
a plurality of fasteners; and
a movable panel mounted alongside of the box,
where the box is mounted to the chassis and the plurality of fasteners affix the movable panel to the body.

3. The motor vehicle of claim 2, wherein the tamper resistant compartment further comprises:
a cover mounted between the movable panel and the box.

4. The motor vehicle of claim 2, wherein the tamper resistant compartment further comprises:
movable step mounted on the chassis.

5. The motor vehicle of claim 1, further comprising:
a battery shut-off switch connected to at least one of the batteries.

6. The motor vehicle of claim 5, wherein the tamper resistant compartment further comprises:
 a box for containing at least one of the batteries, the box is mounted to the chassis;
 a movable panel mounted alongside the box;
 a plurality of fasteners, the fasteners affix and integrate the movable panel to the body; and
 a door, wherein the door is integrated to the body in the closed configuration and in the open configuration the door provides access to the remote battery stud and the battery shut-off switch.

7. The motor vehicle of claim 6, wherein the door further comprises of a lockable latch.

8. A passenger bus using a cutaway truck chassis comprising:
 a chassis;
 a cab body mounted on the chassis;
 a tamper resistant compartment for at least one battery;
 where the tamper resistant compartment is mounted on the chassis and integrated to the cab body;
 a box mounted on the chassis;
 a movable panel integrated to the cab body;
 a door integrated into the movable panel;
 a cover mounted between the box and the movable panel; and
 a movable step mounted on the chassis.

9. The passenger bus of claim 8, further comprising:
 at least one battery contained in the box;
 a remote battery stud connected to at least one of the batteries;
 a battery shut-off switch connected to at least one of the batteries; and
 a bracket mounted to the box that retains the remote battery stud and the battery shut-off switch;
 where the door in the open configuration provides access to the remote stud and the battery shut-off switch.

10. A tamper resistant compartment for a motor vehicle using a cutaway truck chassis comprising:
 a chassis;
 a cab body mounted on the chassis;
 a box mounted on the chassis;
 a bracket mounted to the box;
 a movable panel integrated to the cab body;
 a door integrated to the movable panel;
 a cover mounted between the box and the movable panel; and
 a movable step mounted on the chassis.

11. The tamper resistant compartment for a motor vehicle of claim 10, further comprising:
 at least one battery contained in the box;
 at least one remote battery stud connected to at least one of the batteries; and
 at least one battery shut-off switch connected to at least one of the batteries, through which the door is hinged to provide access to the remote battery stud and the battery shut-off switch when in the open configuration.

* * * * *